United States Patent [19]

Böck

[11] Patent Number: 5,220,598

[45] Date of Patent: Jun. 15, 1993

[54] TELEPHONE

[76] Inventor: Joseph Böck, Vorderdrofstrasse 725, CH-9427 Wolfhalden, Switzerland

[21] Appl. No.: 613,792

[22] PCT Filed: Apr. 3, 1990

[86] PCT No.: PCT/CH90/00088

§ 371 Date: Dec. 5, 1990

§ 102(e) Date: Dec. 5, 1990

[87] PCT Pub. No.: WO90/12468

PCT Pub. Date: Oct. 18, 1990

[30] Foreign Application Priority Data

Apr. 5, 1989 [SE] Sweden ............................ 1251.89

[51] Int. Cl.5 .................. H04M 1/00; H04M 1/02
[52] U.S. Cl. ................................. 379/110; 379/429
[58] Field of Search ............... 379/110, 368, 428, 429, 379/354, 355, 90; 361/414, 398; 357/72

[56] References Cited

U.S. PATENT DOCUMENTS

| 3,564,164 | 2/1971 | Prescott . | |
|---|---|---|---|
| 3,941,951 | 3/1976 | Engstrom et al. . | |
| 4,033,651 | 7/1977 | England, Jr. . | |
| 4,232,203 | 11/1980 | Lenaerts . | |
| 4,271,333 | 6/1981 | Adams et al. ...................... | 379/368 |
| 4,292,481 | 9/1981 | Barnes et al. . | |
| 4,314,117 | 2/1982 | Ditzig ............................... | 361/398 |
| 4,394,545 | 7/1983 | Doyle et al. . | |
| 4,436,965 | 3/1984 | Morse . | |
| 4,677,529 | 6/1987 | Watanabe et al. ................. | 361/414 |
| 4,727,246 | 2/1988 | Hara et al. ........................ | 361/398 |
| 4,734,315 | 3/1988 | Spence-Bate ...................... | 361/414 |
| 4,748,574 | 5/1988 | Tuchto .............................. | 379/110 |
| 4,889,980 | 12/1989 | Hara et al. ........................ | 361/398 |
| 4,927,479 | 5/1990 | Bock . | |
| 4,961,806 | 10/1990 | Gerrie et al. ...................... | 361/398 |

FOREIGN PATENT DOCUMENTS

| 8501913 | 5/1985 | Fed. Rep. of Germany . | |
|---|---|---|---|
| 3039800 | 7/1986 | Fed. Rep. of Germany . | |
| 58-219661 | 12/1983 | Japan ................................. | 361/414 |
| 63-122338 | 5/1988 | Japan ................................. | 379/110 |
| 63-288549 | 11/1988 | Japan ................................. | 379/110 |
| 2135523 | 8/1984 | United Kingdom ................ | 361/414 |

Primary Examiner—James L. Dwyer
Assistant Examiner—Wing F. Chan
Attorney, Agent, or Firm—Blum Kaplan

[57] ABSTRACT

A telephone including a plurality of telephone components hermetically sealed in a plastic housing of plastic film layers. The plastic film layers are compressed together with a film cover to form a film laminate. The telephone components are inserted into recesses in the film laminate.

9 Claims, 3 Drawing Sheets

TELEPHONE

BACKGROUND OF THE INVENTION

The invention relates to a telephone. In the generally known telephones of this type, the telephone is built into a closed housing and a telephone receiver is incorporated with a microphone into a handset.

The objective of the invention is to create a high-quality telephone that can be manufactured at a lower cost and a more rapid pace, as well as in a flatter design, than has been possible until now. This objective is achieved by the invention according to claim 1.

SUMMARY OF THE INVENTION

The laminate construction makes it possible to manufacture a highly compact telephone from several plastic films that are compressed together. The electronic component assemblies, as well as the keys of the keyboard, can be sealed hermetically by plastic films, thus rendering an actual housing unnecessary. A cover made of plastic film can be designed as desired and can also be stamped, making it possible, for example, to obtain borders and recesses enabling the user of the telephone to quickly find the keys. The plastic film cover, as well as the other plastic film parts, are easily modified, thus making it possible to change the design of the telephone at low cost and to adapt it to specific needs. Additional devices, such as, for example, a calculator or a clock, which can also be operated via a keyboard in the plastic film cover can thus be integrated without any substantial increases in the manufacturing costs. The hermetical sealing of the entire electronics unit, resulting from the laminate construction, increase the telephone's reliability and protects the component assemblies from detrimental exposure, such as water, for example. The other claims result in additional advantageous embodiments. One embodiment of the invention is explained in further detail below on the basis of the drawings. Thus are shown in:

DESCRIPTION OF THE PREFERRED EMBODIMENT

Figure 1:
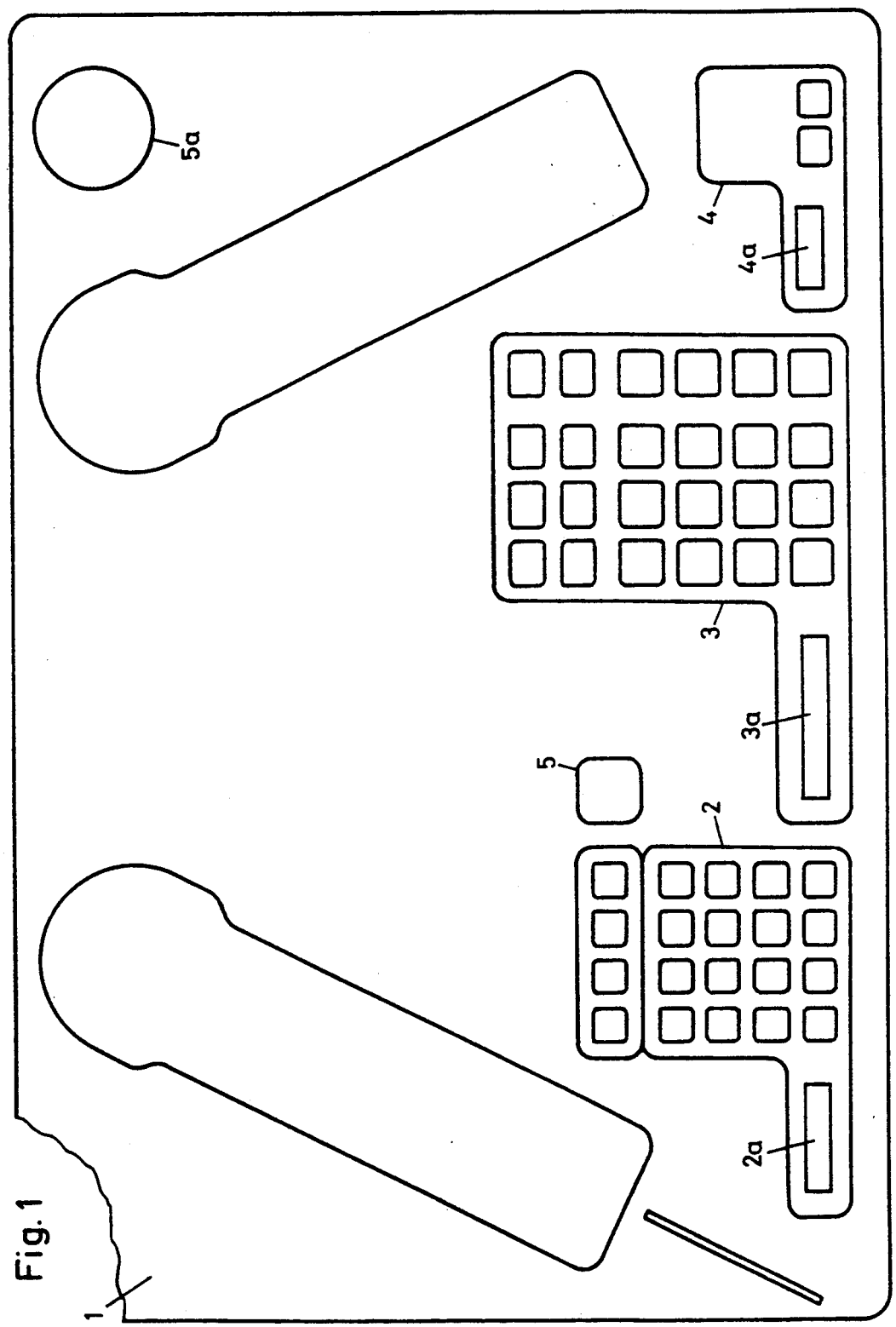
FIG. 1 a top view of the telephone according to the invention.
Figure 4:
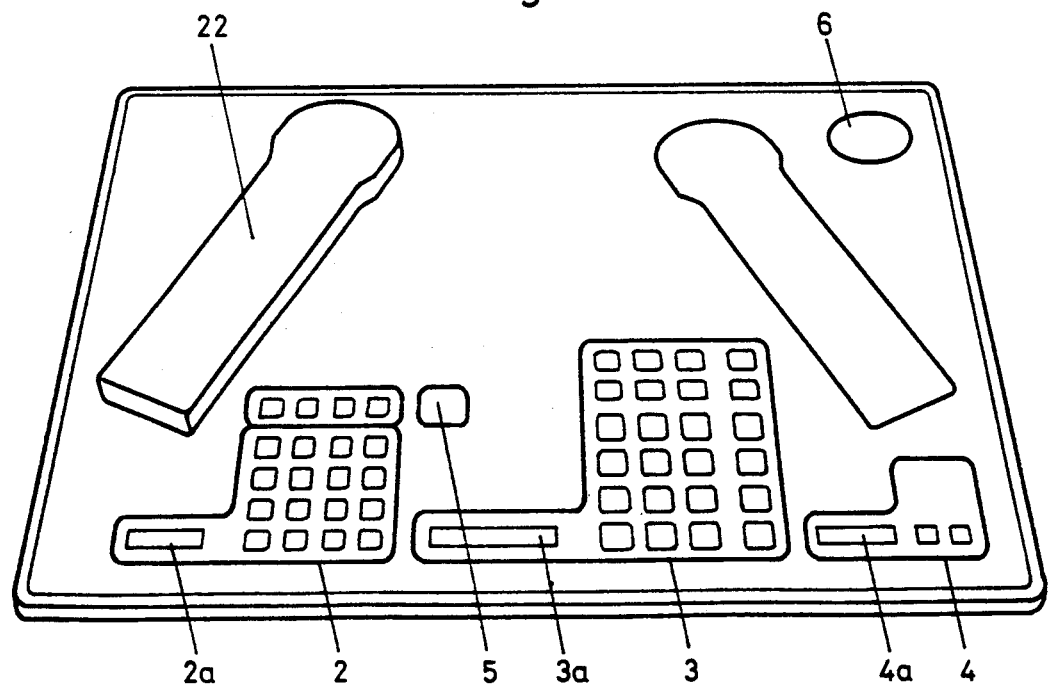
FIG. 4 a perspective drawing of the telephone according to the invention.

A plastic film cover 1, made of polyester, for example, is printed according to both FIGS. 1 and 4. A field 2 denotes the keyboard on which the telephone number to be dialed is entered by punching a keyboard made of plastic film. An additional field 3 denotes a keyboard for a calculator that is constructed on the basis of membrane switches. Finally, a third field 4 refers to keys for an integrated clock. Adjacent to the keyboards the plastic film cover exhibits a transparent area 2a, 3a, and 4a, each revealing a display field, for example, a liquid crystal display. Furthermore, the plastic film cover 1 consists of a field 5 for a microphone arranged beneath it as well as a field 5a for a loudspeaker.

Figure 2:
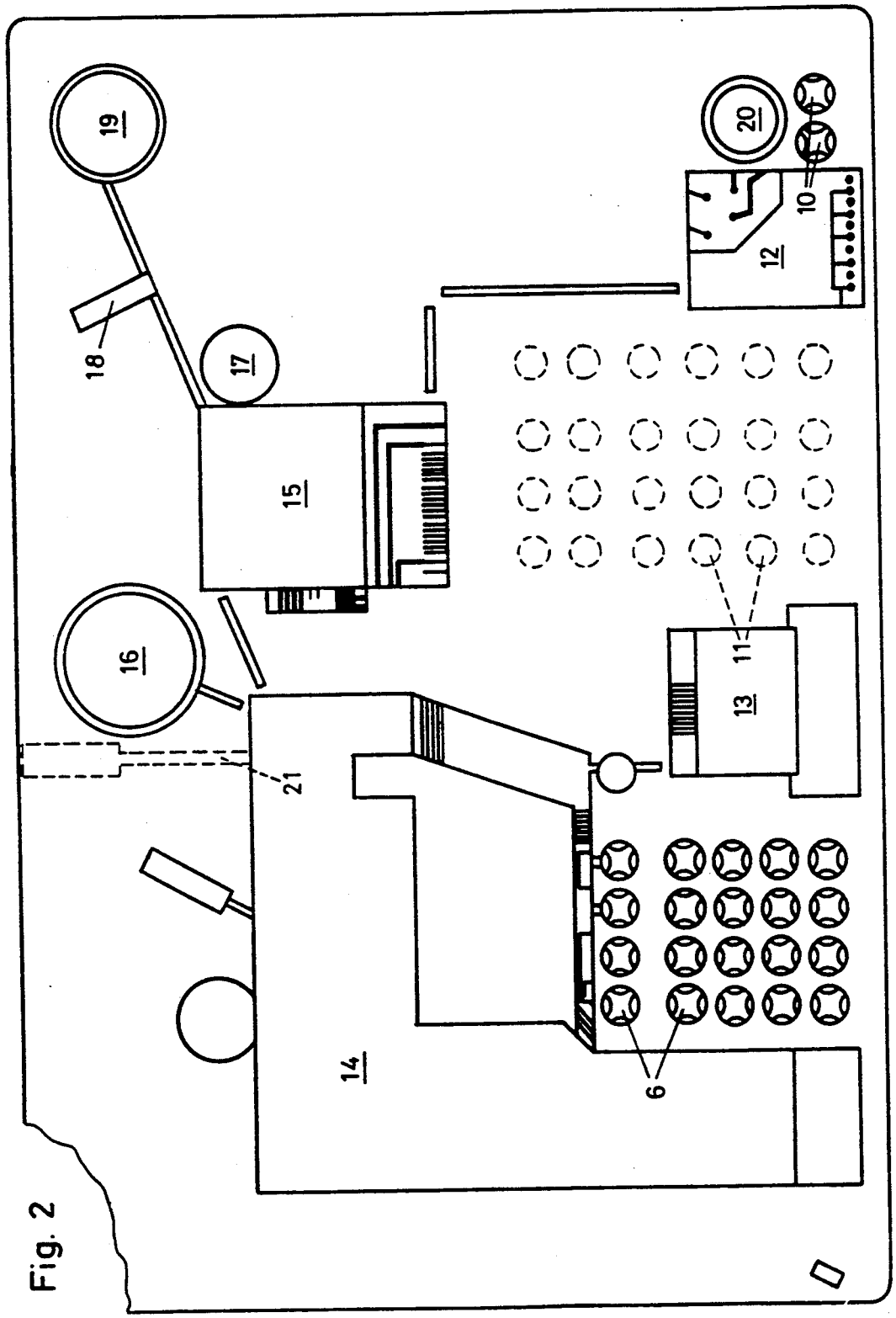
FIG. 2 a top view according to FIG. 1, with the top layer of plastic film having been removed.
Figure 3:
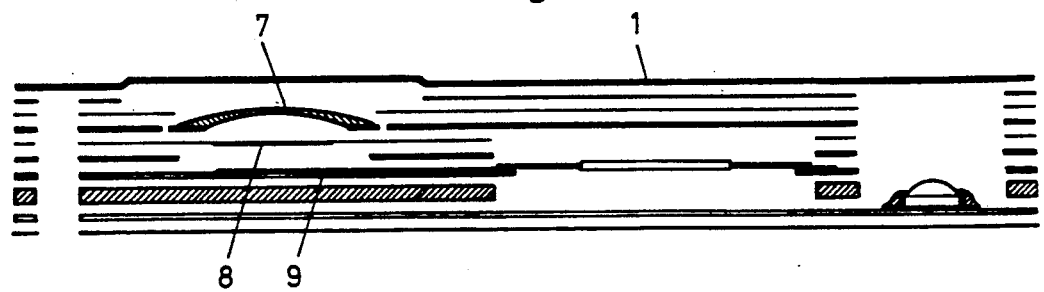
FIG. 3 a schematic representation of a key.

As shown in FIG. 2, keys 6 are arranged beneath field 2 and are activated by touch through the plastic film cover 1. The construction of a key 6 is shown in FIG. 3. When a stamped dome 7 is pressed, two conducting areas 8 and 9 that are arranged in relation to one another are brought into contact. As can be seen, the keyboard is integrated into a plastic film to contact printed circuit. Corresponding keys 10 are intended for operating the integrated clock. Known pressure sensitive keys 11 make it possible to operate a calculator, namely also through the plastic film cover 1.

As is shown in FIG. 2, the plastic films are equipped with punch-outs 12 through 20 that are covered on the front by the plastic film cover 1 and on the back by a basic layer of film. Prepared component assemblies and component parts not shown here are integrated into these punch-outs 12 through 20 and connected to one another via printed boards. How these component assemblies are manufactured is known to the specialist and shall therefore not be explained in this context. The telephone cord not shown here is introduced via a passage 21 leading to the outside. Additional operating elements can be integrated with the housing 22 represented in FIG. 4 that are electrically connected with the other component parts via a cable not shown here.

The calculator and the clock provided in this embodiment can, of course, be eliminated or replaced by other devices.

The thin plastic films that are directly pre-printed with chip carriers form the basis of the entire printed board and of the electronic unit, respectively. The keyboard is integrated into the printed circuit board. This makes it possible to manufacture the telephone in compact and hermetically sealed fashion.

The plastic films compressed with one another form a flat package having a thickness of, less than approximately 10 mm, preferably less than approximately 6 mm. for example, approximately 5 mm. The flatness of the telephone according to the invention is an essential advantage. The hermetical sealing of the entire electronics unit, moreover, increases the reliability of the telephone and protects the component parts from detrimental influences due to exposure. The laminate construction also results in a low unit weight.

The procedural steps essential to the invention are explained in the following:

The polyester plastic films are printed with conduction pastes using silk screening techniques and dried in appropriate devices. An insulating layer is applied over the conduction pastes in the same manner. This construction is repeated in order to obtain a multi-layer printed board. Several plastic films thus processed are laminated on top of one another. Machines having punch-out forms equip the plastic films with the required exterior contours or recesses in the plastic film itself. This results in hollow spaces needed to incorporate the different component parts.

The keyboards or pressure-sensitive switches, respectively, are manufactured according to the same procedure. A hollow space maintains the two contacts at a distance from one another so that a contact is established only when the operator presses the respective key. The plastic film cover can be designed as desired and can also be stamped. Borders and recesses are also possible to enable the operator to find the keyboard immediately. Domeshaped recesses are integrated into the plastic film to provide tactile feedback when data is entered.

Plastic films having an appearance similar to that of 35 mm film strips are glued onto flat chips (wafer chips)

in their basic form to provide the printed-board assembly. The component assemblies thus prepared are subsequently built into the respective hollow spaces in the basic circuit arrangement. The connection to the keyboards and the displays is obtained via conduction technology printed directly onto the plastic films. Production runs involving continuous rolls makes it possible to attain high manufacturing velocities. A device according to EP-PS 0 160 056 is especially suited for compressing the plastic films.

The compressed printed boards, so-called flex prints, are the carrier elements of both the electronic and electrical component parts and are generally known. They are manufactured using Galvano, i.e. etching techniques. The prepared component part carriers are assembled by hand or with the help of robots and are fastened or contacted, respectively, using different linking procedures. SMD technology is a procedure especially suited to this end. The printed boards are partially printed with weldable substrates; subsequently, the component parts are applied with the help of a component insertion machine, subsequent to which they are finally fastened in a process involving heat. The unit is operated via a plastic film keyboard. Plastic films printed on one or both sides with conductive colors are laminated together with adhesive films. They can be punched and formed.

All these components are electrically connected to one another.

Essentially, the telephone according to the invention encompasses widely varying procedures and manufacturing techniques.

I claim:

1. A telephone that is formed as a board and manufactured in a closed laminate construction, comprising telephone components, multiple flexible plastic films and adhesive films compressed with one another to adhesively bond the flexible plastic films with each other to form a film laminate with recesses, the telephone components inserted into the recesses and a plastic film cover for hermetically sealing the telephone components within the resulting laminate construction.

2. Telephone, according to claim 1, whereby flat chips (wafer chips) in their basic form are glued onto the film and whereby telephone component assemblies thus prepared are integrated into hollow spaces in at least one of the plastic films of the film laminate.

3. Telephone according to claim 1, wherein at least a portion of the plastic film of the film laminate forms a keyboard.

4. Telephone according to claim 3, further including a display with the keyboard connected to the display via conduction paths printed directly onto the plastic films.

5. Telephone according to claim 1 whereby the film laminate is less than approximately 10 mm thick.

6. Telephone according to claim 2, wherein the plastic film cover includes printed operating fields.

7. Telephone according to claim 5, whereby an acoustic receiver and an acoustic emitter, each of which are manufactured from plastic films, are integrated into the film laminate.

8. Telephone according to claim 1, including an electronic calculator, and whereby the electronic calculator is integrated into the film laminate.

9. Telephone according to claim 1, with the plastic films laminated with adhesive films, and whereby the film laminate is less than approximately 6 mm thick.

* * * * *